United States Patent Office 3,306,340
Patented Feb. 28, 1967

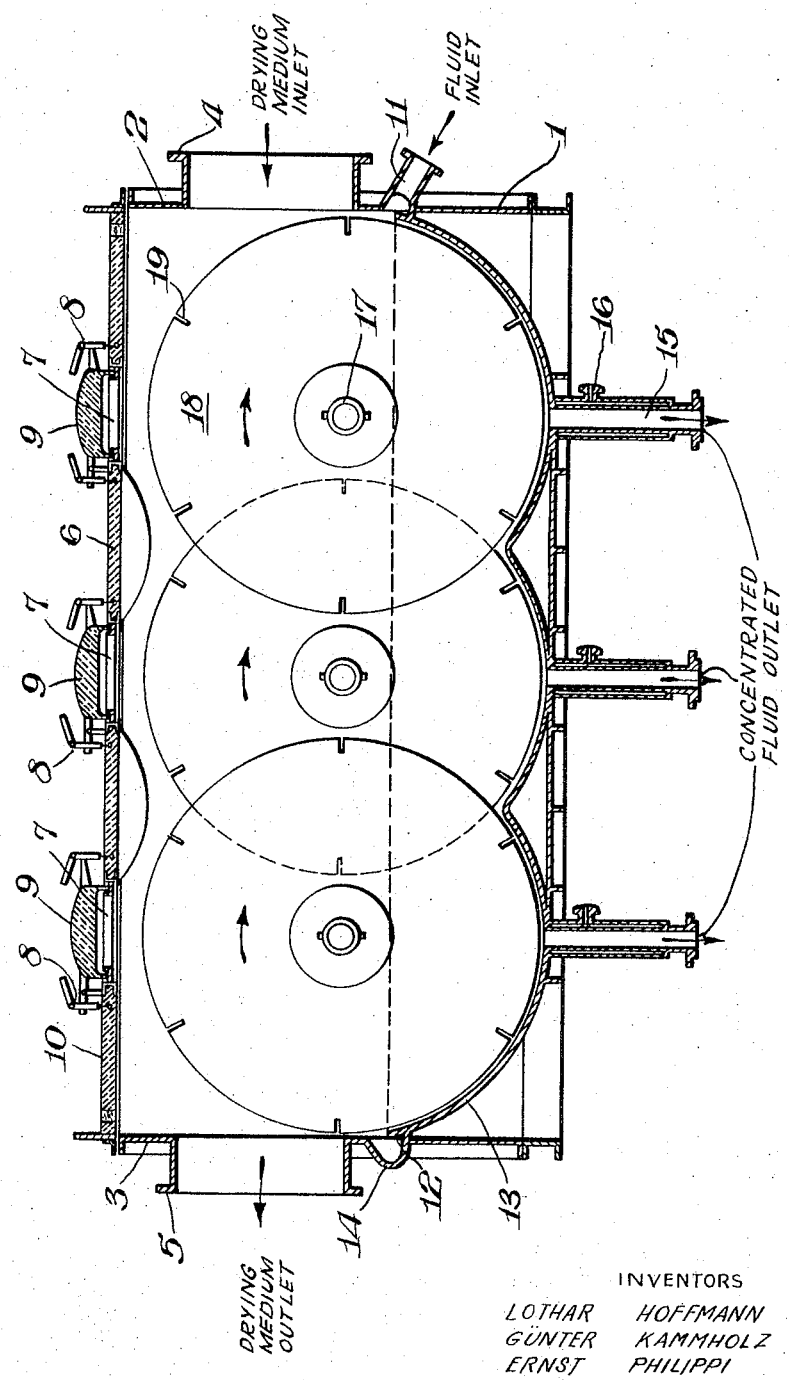

3,306,340
PROCESS AND APPARATUS FOR THE CONCENTRATION OF TEMPERATURE SENSITIVE FLUIDS
Lothar Hoffmann, Holzrichterweg 32, Dortmund-Bittermark, Germany; Günter Kammholz, Gladbeckerstr. 70, Gelsenkirchen-Bauer, Germany; Ernst Philippi, Poststrasse 4, Herten-Scherlebeck, Germany; Gerhard Meyer, Gerd-Hauptmannstr. 12, Gelsenkirchen-Bauer, Germany; and Heinz Werner, Jurgengang 36, Essen, Germany
Filed Apr. 20, 1965, Ser. No. 449,446
4 Claims. (Cl. 159—10)

This invention relates to a procedure as well as to an appliance for the concentration of fluids which are temperature-sensitive, especially manure mashes by evaporation of a solvent.

When producing products and intermediate products in the foodstuffs, chemistry and fertilizer-industry, there exists in numerous cases the necessity to concentrate a suspension or a solution of the product in water or in another solvent by evaporation of the solvent. Where the treated substance is insensitive to temperature increases, the solution usually is heated up to the boiling point so that the solvent can evaporate. The problem is more difficult when substances sensitive to temperature are to be concentrated, especially where the substances tend to deposit and to bake on the heat exchange surfaces.

A variety of evaporator-constructions are known which are useful for special purposes. It is, e.g., possible to control the temperature by using a vacuum-evaporator with circulation guidance and to avoid the baking on the heating surfaces by means of strippers. By blowing air or inert gas into the fluid or over a fluid film, the concentration can take place at a relatively low temperature due to the decrease of the partial pressure on the fluid.

The known methods require, however, a complicated and extensive apparatus if the desired effect is to be attained with any degree of certainty. This expenditure is substantially increased if the substance to be concentrated is corrosive.

An object of this invention is to find a procedure which allows a very good controllable evaporation of the solvent out of the treated and fluid substance, by means of a simple method and apparatus.

A further object of this invention is to provide such a method and apparatus in which the problem of handling evaporation far below the boiling point of the fluid is eliminated, so that the fluid is not heated considerably, whereby local overheatings are eliminated and bake-on is rendered impossible.

The procedure according to the invention is especially suitable for the concentration of manure mashes, but it is also suitable in the same or in a modified form, for the solution of evaporation problems in other fields.

Nearly all producing methods for fertilizers use water as the solvent because of the use of acids. This water can partly be removed by utilization of heats of reaction and by using conventional evaporators. These methods fail, however, where a considerably high concentration is desired. When using the known methods, comparatively low successes must be put up with, with either high losses of nitrogen or with the fact that the solubility of $P_2O_5$ turns from the water soluble form to the citrate soluble form and from this finally to a citrate unsoluble form which means losses of $P_2O_5$. Furthermore, the appliances used for the execution of the known methods are very susceptible to interference. These appliances must also occasionally have to be deliberated regularly from the substances baked on the heating surfaces which involves a troublesome procedure.

Considering these difficulties one forgoes mostly in practice a high concentration of the manure mash and instead removes the humidity in a drying plant which actually only serves to give a good storage stability to the fertilizer. The watery fertilizer solution is mixed with large quantities of already dried material, whereby the water content of the mixture is decreased to about 4% which is the suitable percentage height for the granulation. After the granulation follows a drying process in a drying plant, a classification and occasionally a cooling. The under-size grain, over-size grain, or if necessary the normal-size grain occurring when classifying, are added as refluxing material to the watery mash. This known method has first the disadvantage that the heat consumption necessary for the evaporation per kg., is very high, as not only the production quantity has to be heated but also the quantity kept in the circulation. The heat losses amount to about 70–80%. On the other hand, large quantities of dried products would have to be held in the circulation and this fact would demand a corresponding demensioning of the drying plant and the transport system. In some methods the quantity of the circulating material is nine times as large as the production quantity.

Following the procedure according to the present invention, it is now possible to concentrate the watery solutions of manure mashes at a low temperature. By this the losses of nitrogen caused by decomposition or $P_2O_5$-losses causes by transformation into an unsoluble form, are completely avoided.

Following the procedure according to this invention, the mash which is to be concentrated, is exposed as a steadily renewed film to a hot air current which absorbs the water evaporating from the mash. In spite of the hot air flowing over the film the temperature of the film does not increase because of the cold due to the evaporation. The exchange of material and heat takes place at the surface of the film and not at the contact surface of the apparatus. A disk concentrator is especially suitable for the execution of this procedure, which consists mainly of a closed container serving to absorb or hold the substances which are to be dehydrated; this container is preferably in a rectangular, flat form developed as a trough or tub possessing an inlet and an outlet for the substance to be treated, as well as an entrance and an exit for the gas used as drying medium. In the container one or several shafts are arranged which run parallel and carry a quantity of disks. These disks dip partly into the substance to be treated and carry, when rotating, a part of this substance as a film into the gas-chamber which lies over the fluid, where the flowing gaseous drying medium extracts water out of the treated substance. This process proceeds continuously. The duration can be regulated according to the operations-requirements in a simple way by regulation of the supply; while the degree of dryness is adjusted by the rotation speed, the dry medium quantity or by the temperature of the drying medium. The supply direction of the gaseous drying medium is advisably chosen in a way that the gas current flows in longitudinal direction along the disks, whereby the direction can be the same or reverse to the current direction of the mash. The heat requirement necessary for this procedure differs and depends on the treated substance and the desired final concentration. The utilization of the thermal energy supplied by the drying medium is, however, in any case very high.

In the drawing is shown a schematic view of one embodiment of this invention.

As shown in the drawing an elongated, trough-shaped container 1 has at both its sides 2 and 3 a nozzle 4 for the entrance of the drying medium and a nozzle 5 at the exit of the drying medium which is enriched with evaporated fluid.

The container is closed with a cover 6. Access may be had to the interior of the container without removing the cover, by openings 7 each of which is closed over eccentric shutters 8 with a shutter cowl 9. For preventing heat losses by emission, that part of the container admitting the drying medium may be provided by a protective insulation 10. The goods to be dried enter through the nozzle 11. The weir lifting edge 12 of the container bottom 13 assures the adjustment of a desired liquid level in the container. A surplus of liquid can be led off the channels 14. When the evaporated goods to be dried have reached the desired consistency, they are extracted through the exit nozzles 15.

A heating appliance 16 is arranged in order to prevent the solidification of the goods to be dried by cooling down in these exit nozzles. At a right angle to the direction of flow of the current of the drying medium, the container is equipped with shafts 17 which carry a plurality of disks 18. The shafts are arranged in such a way that the disks fixed to it are staggered or overlap each other partly whereby the adjacent disk rotates in the space of the disk which is fixed on the next lying shaft. The disks are rotated by means of a transmission, and rotate all in the same direction. Small rotating notches 19 at the outer perimeter of the disk allow trifling edge-turnover of this part of the disk.

Thus as discs 18 rotate through the fluid in the bottom of container 1, the fluid is being mixed or recirculated so that the fluid at the exposed surface is constantly changing. As a result the fluid uniformly increases in concentration because the drying gas evaporates solvent from the surface or top film of the fluid and discs 18 cause this surface or top film to be constantly changing.

The provision of notches 19 in discs 18 which lifts some of the fluid from one part of the main body of fluid, and drops the lifted fluid to another part of the main body, effectively aids in the constant turnover or mixture of the fluid.

Additionally the provision of weir lifting edges 12 cause the bottom of container 1 to be undulated or correspond to the shape of discs 18. This eliminates stagnant areas ii the bottom of container 1 and assures discs 18 of reaching fluid throughout the bottom of the container 1

In the following examples the expressions "KAS-mash" and "NP-mash" are used to designate respectively Kalkammonsalpeter (which is indicated with ammonia nitric limestone), and the NP-mash is a mixed or complexed fertilizer.

Some examples for the use of the procedure according to this invention, for the field of the fertilizer production, are given in the following text.

*Examples*

(1) In a 4-shaft-operating disk concentrator KAS-mash was dried in continuous supply of 14 tons/hr. with hot air (entrance temperature 350° C., exit temperature 112° C.) in reverse current.

The analysis of the mash when entering into the disk concentrator has the following values:

| | Percent |
|---|---|
| N | 17.85 |
| $H_2O$ | 19.3 |

At the outlet it had the following composition:

| | Percent |
|---|---|
| N | 19.15 |
| $H_2O$ | 13.8 |

(2) In a small trial disk concentrator with one shaft, NP-mash was dried in continuous supply of 170 kg./hr. with hot air in reverse current (entrance temperature 306° C., exit temperature 159° C.).

The mash had before the concentration, the following composition:

| | Percent |
|---|---|
| Entire $P_2O_5$ | 16.38 |
| Citrate solubility | 97.6 |
| Citrate soluble $P_2O_5$ | 16.0 |
| N | 16.27 |
| $H_2O$ | 21.4 |

At the outlet of the disk concentrator the result of the analysis of the mash shows the following values:

| | Percent |
|---|---|
| Entire $P_2O_5$ | 17.65 |
| Citrate solubility | 98.0 |
| Citrate soluble $P_2O_5$ | 17.2 |
| N | 17.23 |
| $H_2O$ | 14.7 |

When comparing the two analyses it was shown that the $H_2O$ content is diminished for about ⅓ and that, in spite of this concentration, no deterioration of the citrate solubility and no N-loses occured.

(3) In a 4-shaft-operating disk concentrator NP-mash was dried in continuous supply of 11 tons/hr. with hot air in reverse current (entrance temperature 300° C., exit temperature 188° C.).

The analysis of the mash before its entrance into the disk concentrator shows the following values:

| | Percent |
|---|---|
| Entire $P_2O_5$ | 16.7 |
| Citrate solubility | 97.3 |
| Citrate soluble $P_2O_5$ | 16.35 |
| N | 17.0 |
| $H_2O$ | 19.3 |

At the exit of the disk concentrator the following composition was stated:

| | Percent |
|---|---|
| Entire $P_2O_5$ | 18.2 |
| Citrate solubility | 98.6 |
| Citrate soluble $P_2O_5$ | 17.95 |
| N | 18.7 |
| $H_2O$ | 10.0 |

Nearly half the water was removed under these conditions without any disadvantageous change of the NP-mash. The citrate solubility of the $P_2O_5$-constituent did not deteriorate and N-losses would neither be observed.

Obviously, many modifications and variations of the present invention are possible in the light of the above teachings. It is therefore, to be understood that within the scope of the appended claims the invention may be practiced otherwise than as specifically described.

What is claimed is:

1. A method of increasing the concentration of temperature-sensitive manure mashes by evaporating the solvent containing the substance to be concentrated comprising introducing the diluted mash into a container, rotating a plurality of staggered, overlapped, parallel and vertical discs through said mash with a portion of each disc being above said mash to cause turnover of said mash, preventing mash stagnation by passing the mash over the undulated bottom of the container which conforms to disc bottom arrangement, and passing a gaseous drying medium over said mash adjacent its surface in a direction of flow parallel to the planes of rotation of said discs and contrary to the direction of movement of the upper portions of said discs whereby the solvent is evaporated at the surface of said mash and heating the mash as it is drained from the container.

2. An apparatus for increasing the concentration of a fluid by evaporating the solvent containing the substance to be concentrated comprising a container for holding the fluid, fluid entrance and exit means in said container, a drying medium inlet in said container, a drying medium outlet in said container opposite from said inlet whereby the drying medium may flow across said container, shaft means in said container disposed perpendicular to the path of flow of said drying medium, disc means on said shaft means for rotating parallel to the flow of the drying medium, means in the bottom of said container for regulating the fluid level in said container whereby said disc means will extend partly into the fluid and remain partly out of the fluid, said shaft means comprising a plurality of shafts, said disc means comprising a plurality of discs on each shaft, said shafts being spaced apart a distance less than the diameter of said discs, said discs being staggered on said shafts, drive means for rotating all of said discs in the same direction, said drying medium inlet and outlet being adjacent the fluid surface with said discs extending above said inlet and outlet, the bottom surface of said container being undulated to conform to the shape of said discs, and heated drain means located at the lowest portion of each undulation to prevent the fluid from solidifying as it is drained.

3. The apparatus of claim 2 wherein the periphery of said each disc is notched.

4. The apparatus of claim 2 wherein weir lifting edge means are on the bottom of said container.

References Cited by the Examiner
UNITED STATES PATENTS

| | | | |
|---|---|---|---|
| 1,253,401 | 1/1918 | Lorimer | 261—92 |
| 1,976,228 | 10/1934 | Hutzel | 261—92 |
| 2,056,266 | 10/1936 | Goodell | 23—48 |
| 2,145,374 | 1/1939 | Salerni | 261—92 |
| 2,230,196 | 1/1941 | Clayton | 159—48 X |
| 2,397,818 | 4/1946 | Tausch | 159—9 |
| 2,873,799 | 2/1959 | Earley et al. | 159—49 |
| 3,082,816 | 3/1963 | Skidmore | 159—49 |

NORMAN YUDKOFF, *Primary Examiner.*

J. SOFER, *Assistant Examiner.*